United States Patent [19]
Brookes

[11] Patent Number: 5,428,778
[45] Date of Patent: Jun. 27, 1995

[54] SELECTIVE DISSEMINATION OF INFORMATION

[75] Inventor: Cyril Brookes, Sydney, Australia

[73] Assignee: Office Express Pty. ltd., Sydney, Australia

[21] Appl. No.: 304,812

[22] Filed: Sep. 13, 1994

Related U.S. Application Data

[63] Continuation of Ser. No. 834,788, Feb. 13, 1992, abandoned.

[51] Int. Cl.⁶ ............................................. G06F 17/30
[52] U.S. Cl. ................................... 395/600; 364/974.5; 364/974.6; 364/DIG. 2
[58] Field of Search ................... 364/DIG. 1, DIG. 2; 395/600

[56] References Cited

U.S. PATENT DOCUMENTS

| | | | |
|---|---|---|---|
| 4,270,182 | 5/1981 | Asija | 364/900 |
| 4,429,385 | 1/1984 | Cichelli et al. | 370/92 |
| 4,823,306 | 4/1989 | Barbic et al. | 364/900 |
| 4,868,866 | 9/1989 | Williams, Jr. | 380/49 |
| 4,908,758 | 3/1990 | Sanders | 364/300 |
| 4,914,586 | 4/1990 | Swinehart et al. | 364/200 |
| 4,956,769 | 9/1990 | Smith | 364/200 |
| 5,020,019 | 5/1991 | Ogawa | 364/900 |
| 5,047,918 | 9/1991 | Schwartz et al. | 364/200 |
| 5,107,419 | 4/1992 | MacPhail | 395/600 |
| 5,109,508 | 4/1992 | Mitsumori et al. | 395/600 |
| 5,115,504 | 5/1992 | Belove et al. | 395/600 |
| 5,140,692 | 8/1992 | Morita | 395/600 |
| 5,175,855 | 12/1992 | Putnam et al. | 395/700 |
| 5,206,949 | 4/1993 | Cochran et al. | 395/600 |
| 5,230,048 | 7/1993 | Moy | 395/600 |
| 5,237,411 | 8/1993 | Fink et al. | 358/146 |
| 5,263,157 | 11/1993 | Janis | 395/600 |
| 5,263,167 | 11/1993 | Conner, Jr. et al. | 395/700 |
| 5,293,552 | 3/1994 | Aalbersberg | 364/419.19 |
| 5,317,507 | 5/1994 | Gallant | 364/419.13 |
| 5,321,833 | 6/1994 | Chang et al. | 395/600 |

FOREIGN PATENT DOCUMENTS

| 364179 | 4/1990 | European Pat. Off. |
| 420424 | 4/1991 | European Pat. Off. |

OTHER PUBLICATIONS

"The Rapport Multimedia Conferencing System", S. R. Ahuja, et al., AT&T Bell Laboratories, 1988 *ACM*, pp. 1-8.

"The Evolution of User Behavior in a Computerized Conferencing System", Starr Roxanne Hiltz and Murray Turoff, *Communications of the ACM*, Nov. 1981, vol. 24, No. 11.

"Knowledge Based Document Classification Supporting Integrated Document Handling", Helmut Eirund and Klaus Kreplin, 1988 *ACM*, pp. 189-196.

"Beyond The Chalkboard: Computer Support Collaboration and Problem Solving in Meetings", Mark Stefik, et al., *Communications of the ACM*, Jan. 1987, vol. 30, No. 1.

"Intelligent Information-Sharing Systems", Thomas W. Malone, et al., *Communications of the ACM*, May 1987, vol. 30, No. 5.

*Primary Examiner*—Thomas G. Black
*Assistant Examiner*—Maria N. Von Buhr
*Attorney, Agent, or Firm*—Marshall, O'Toole, Gerstein, Murray & Borun

[57] ABSTRACT

A database method and system for disseminating information to user, and for alerting users to the disseminated information, stores a plurality of parameters in association with information items. The plurality of parameters includes at least one keyword taken from a finite hierarchical set of keywords indicative of the subject matter of the information items, and a priority level value indicative of the perceived importance of the information items. The finite hierarchical set of keywords has a tree structure relating broad keywords to progressively narrower keywords. An interest profile is created for each of the users and comprises a list of keywords, selected from the finite hierarchical set, and a priority level associated with each keyword. The parameters stored in association with each information item, and the stored interest profile for that user, are compared. Each user whose interest profile matches the parameters of the information item is alerted to the presence of the matching information item.

21 Claims, 13 Drawing Sheets

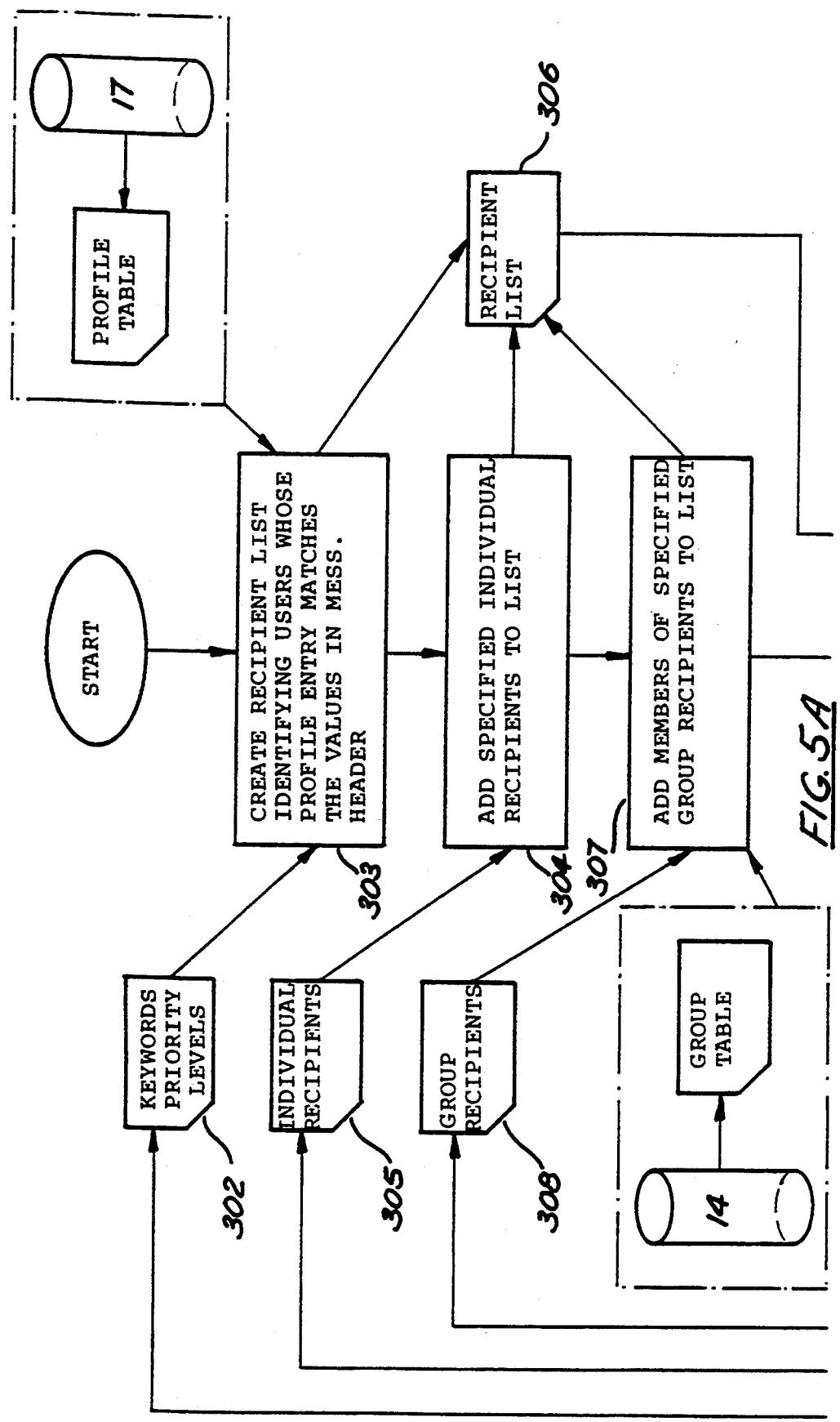

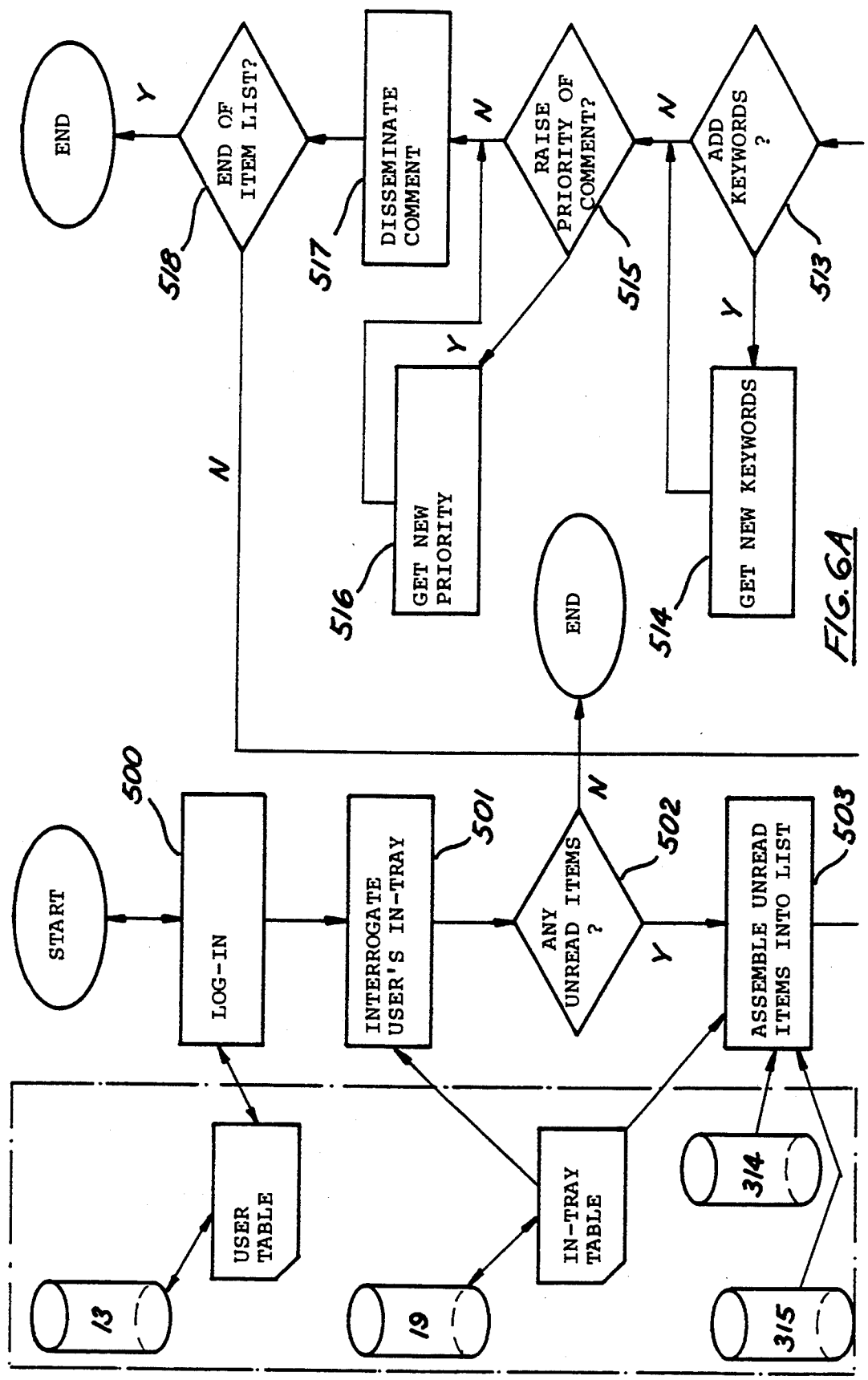

SELECTIVE DISSEMINATION OF INFORMATION

This is a continuation of U.S. application Ser. No. 07/834,788, filed Feb. 13, 1992, now abandoned.

TECHNICAL FIELD

This invention relates to information technology and, in particular, to a method and apparatus whereby users of a database system may be alerted to important information including text, graphics and other electronically stored information within the system and by which means information may be efficiently disseminated.

BACKGROUND OF THE INVENTION

Conventional information services provide a spectrum of features. At one end of the scale, simple databases allow users to access information according to a more or less specialised indexing arrangement; however the efficiency of such a system depends on the ease of use of the indexing arrangement and relies on the users to search for the information they require. General computer conferencing systems gather information related to a broad topic and make it available to users but do not classify information according to importance nor do they provide adequate alerting to users of information availability or adequately preserve the context of information having regard to previous related items. Electronic mail allows information to be directed to specific users and thus permit interactive access to information and communication of ideas, but this arrangement relies on the originator of the information knowing the interests and talents of each potential communicatee.

Furthermore, the increasing complexity and quantity of data available from information services has generated new problems for both providers and consumers, including: how to distinguish useful information from irrelevant material; how to determine the reliability of information; and how to link new information with earlier reports on related topics.

These problems arise when inadequate criteria are applied to information distribution, and when soft (or informal) information is not collected and disseminated effectively.

It is an object of the present invention to provide methods and apparatus for efficient dissemination of information which overcome, or at least ameliorate, some of the disadvantages of the prior art.

SUMMARY OF THE INVENTION

In a first aspect of the present invention, a database user alerting method, for use with a database system in which are stored a plurality of information items includes the steps, performed in a computer system, of:
  storing in association with each information item in the database system a plurality of parameters including (i) at least one keyword indicative of the subject matter of said information item and (ii) a priority level value indicative of the importance of said each information item, said at least one keyword being selected from a finite hierarchical set of keywords having a tree structure relating broad keywords to progressively narrower keywords;
  creating and storing an interest profile for each database user indicative of categories of information of interest to said each database user, said interest profile comprising (i) a list of keywords taken from said finite hierarchical set and (ii) an associated priority level value for each keyword;
  comparing the parameters stored in association with each information item with the stored interest profile for each database user; and,
  alerting a database user of the existence of an information item when said interest profile for that database user includes (i) at least one keyword associated with the information item and (ii) a priority level value for each information item, wherein said priority level value is selected from a predetermined set of priority level values, and wherein said at least one keyword is selected from a finite hierarchical set of keywords having a tree structure relating broad keywords to progressively narrower keywords
  means to store said plurality of information items;
  means to store, in association with each of said information items, a plurality of parameters including (i) at least one keyword indicative of the subject matter of each of said information items and (ii) a priority level value for each of said information items, wherein said priority level value is selected from a predetermined set of priority level values, and wherein said at least one keyword is selected from said hierarchical set
  means to create an interest profile for each of said database users indicative of categories of information of interest to said database users, said interest profile comprising (i) a list of keywords taken from said finite hierarchical set and (ii) an associated priority level value for each keyword;
  comparator means to determine said selected items of information of interest to each database user by comparing the parameters stored in association with each information item with the parameters stored in the interest profile for each database user and by selecting information items when the interest profile for a database user includes (i) at least one keyword associated with the information item and a priority level value associated with the at least one keyword does not exceed the priority level value associated with the information item; and,
  output means to output an indication of the or each selected items of information of interest to each corresponding database user.

Preferably, the priority level is a value within a range of low to high priority levels and the method further includes the step of increasing the number of keywords stored in association with an information item in proportion and in response to an increased priority level. Preferably, keywords broader than the previous selected keyword or keywords are added.

Preferably, a used is permitted to create a comment information item related to an original information item by its parameters. Where several related comment items, together with an original item, form a "discussion" by one or more users, provision is preferably made to preserve the "context" of the discussion items by presenting the user creating a comment item with a default set of parameters replicating the parameters of the original item and inviting the user to modify the default parameters.

Preferably also, the parameters stored in association with each information item include a value indicative of an expiry date, at which time the utility of the information item is deemed to be negligible. Deleting and archiving of information items is performed after the expiry date is reached and, for groups of related comment items, after the latest expiry date of any item in the group is reached.

Provision is also preferably made for restriction of dissemination of information to members of distribution groups or security groups. Distribution groups can be formed by any user whereas security groups are created by a system administrator according to the permitted access to information of the respective users.

A conventional database system of text and image information generally includes a number of information items which may be retrieved, examined and possibly modified by reference to a more or less specific indexing scheme. Such a system may assign to each item of information in the system a descriptive label comprising one or more keywords chosen according to the subject matter of the database to classify the information it contains. Where information is entered by the users of the system, the responsibility of classification can be addressed by those users. It is also possible, for example where information is derived from very specialised sources, to classify the data automatically rather than by user intervention. For this purpose, the occurrence of keywords and phrases matching those in a list of topics can be taken as a clue to the subject matter and used for classification.

A particular advantage of the present invention is that by taking keywords from a hierarchical list, where different levels contain keywords of different scope, and relating the level of keyword to the perceived importance of the information it describes, users may obtain or receive information of selected importance in addition to nominated subject matter.

BRIEF DESCRIPTION OF THE DRAWINGS

A preferred embodiment of the present invention will now be described, by way of example only, with reference to the accompanying drawings in which:

FIGS. 5(A) and 5(B), taken together, is a flowchart illustrating the item dissemination subsystem of FIG. 2;

FIGS. 6(A) and 6(B), taken together, is a flowchart illustrating the commenting/discussion building subsystem of FIG. 2;

DESCRIPTION OF THE PREFERRED EMBODIMENT

Figure 1:
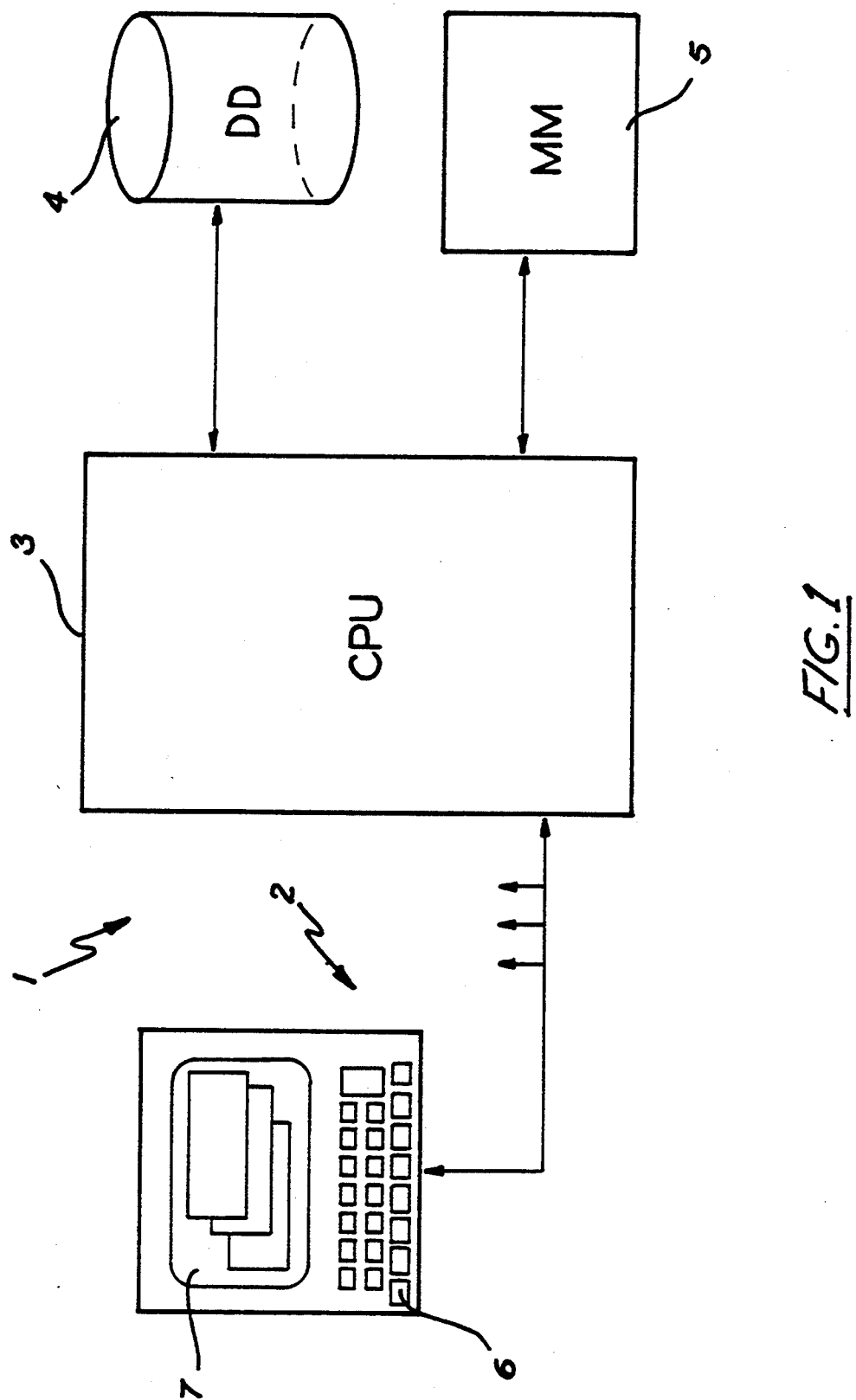
FIG. 1 is a block schematic diagram illustrating a computer system for use with the invention.

In the preferred embodiment of a system in accordance with the present invention, a computer system as illustrated in FIG. 1 is employed. Referring now to FIG. 1, the computer system 1 comprises a plurality of terminals 2 connected to a central processing unit (CPU) 3 having mass storage in the form of a disk drive 4 and main memory 5. Each terminal provides a keyboard 6 for interrogating the system of the invention and for data entry. In addition a video display unit (VDU) 7 is provided for the display of system responses and prompts. Although a system in accordance with the invention may be implemented on a computer having a single keyboard and VDU, such as a personal computer, it will be appreciated that the dissemination of information amongst a large number of users is best approached through a multi-user system. A network of computers (whether personal or multi-user) would also be appropriate.

Figure 2:
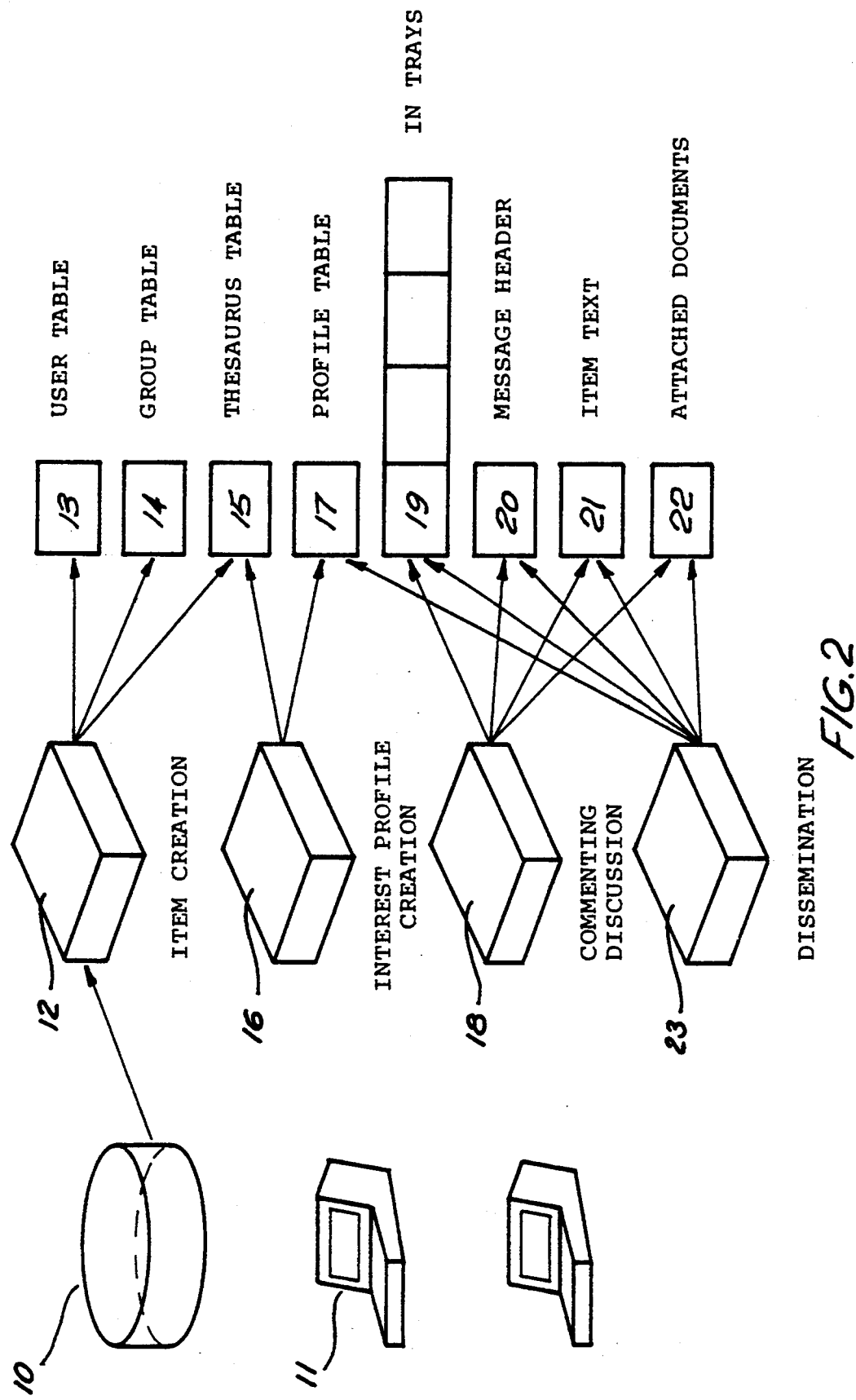
FIG. 2 is a schematic diagram illustrating major subsystems of a preferred embodiment in accordance with the present invention.

In use, a software package implementing the system of the invention is executed by the computer system of FIG. 1 in conventional manner. The software maintains a database in mass storage and manages a number of ancillary files, as will be discussed hereafter. The software may be designed as a single integrated program or as a suite of programs, each responsible for a subsystem of the complete system. FIG. 2 shows in schematic form the major subsystems of the preferred embodiment and therefore provides an overview.

Referring to FIG. 2, information items are collected and entered into the system either by batch entry 10 from abstracting services, wire services, clipping services and the like, by submission from electronic mail terminals or by on-line entry from system users 11. Information entered by system users may include ideas, assessments, rumours, predictions, explanations and the like, and may be directly entered or copied from another source. Following entry each item is classified according to the information it contains, the audience for which it is intended, and other parameters selected by the originator. Some of the classification may be automated. The Item Creation Subsystem 12 leads the user through the classification of the item and accesses a number of ancillary files in mass storage. As will be discussed in more detail hereafter, the files shown in FIG. 2 are User Table 13, Group Table 14 and Thesaurus Table 15.

Similarly, the Interest Profile Creation Subsystem 16 accesses a Profile Table 17 file and refers to the Thesaurus Table 15.

The Commenting/Discussion-Building Subsystem 18 accesses IN-Tray 19 files, Message Header 20, Item Text 21 and Attached Document 22 files.

The Dissemination Subsystem 23 accesses all the last four files in addition to the Profile Table 17.

The use of files to pass data between subsystems is an approach leading to a more modular and therefore reliable system. It will be appreciated however that in other embodiments different techniques may be used without departing from the principle of the invention.

Central to the classification of information items in the preferred embodiment is the assignment of keywords according to the content of the item. Keywords are chosen either automatically by scanning the text or by user selection from a hierarchical list linking broader topics to related narrower topics. The list, or topic structure, is known as a thesaurus, although synonyms are not used. Keywords for information classification may be taken only from the thesaurus. It will be understood that, in the context of the present invention, 'keyword' includes descriptive phrases. The hierarchical organisation of the thesaurus reflects the generality of keywords.

Sample thesauri are shown in Tables 1 and 2. Each keyword below the top level ('EXECUTIVE' and 'MARKETING AND SALES') has at least one broader keyword and may have one or more narrower keywords associated with it. Thus, for example, in Table 2 CUSTOMERS is a narrow keyword related to MARKETING AND SALES, but is broader than RETAIL CUSTOMERS. Note that ellipsis in both Tables 1 and 2 indicates the omission of one or more levels of the thesaurus. The keywords are based on the work context so that they are reasonably mnemonic, if not intuitively obvious, to the users. In some organisations activity falls into distinct and even non-interacting categories, such as research and marketing. A single thesaurus designed to accommodate all possible activities of interest to a multi-faceted organisation would be too cumbersome for the users to handle easily. Selecting a keyword from a very large thesaurus would be a difficult proposition. The system therefore provides multiple thesauri, each directed to a different field of activity. In this situation the user must specify the thesaurus as 'keys' in a database search.

In addition to the keywords associated with each item of information, the system assigns or asks the user to assign a priority level or importance value to each item. The priority level represents the item's perceived importance. Typically, a finite set of priority levels is permitted. In the preferred embodiment four such values are allowed; these are low, medium, high and urgent corresponding roughly to routine, unusual, important and critical items of information. There is, however, no fundamental bar to a greater or lesser number of priority levels; the choice must be made so that meaningful differences can be distinguished.

It will be apparent that although 'perceived importance' may be indicated by or inferred from the source of the information (e.g. news services) it will often be a subjective judgment which must be made by the users. This however is a fundamental advantage of the present invention and will be described more fully below.

Further parameters are assigned to each information item to assist in system administration. These parameters include: author identification, source identification and a time stamp. To further facilitate dissemination of information the system recognises that users may form distinct groups. Thus, for example, an information item may be labelled so as to restrict dissemination to only those users specified as a security group.

Figure 3A:
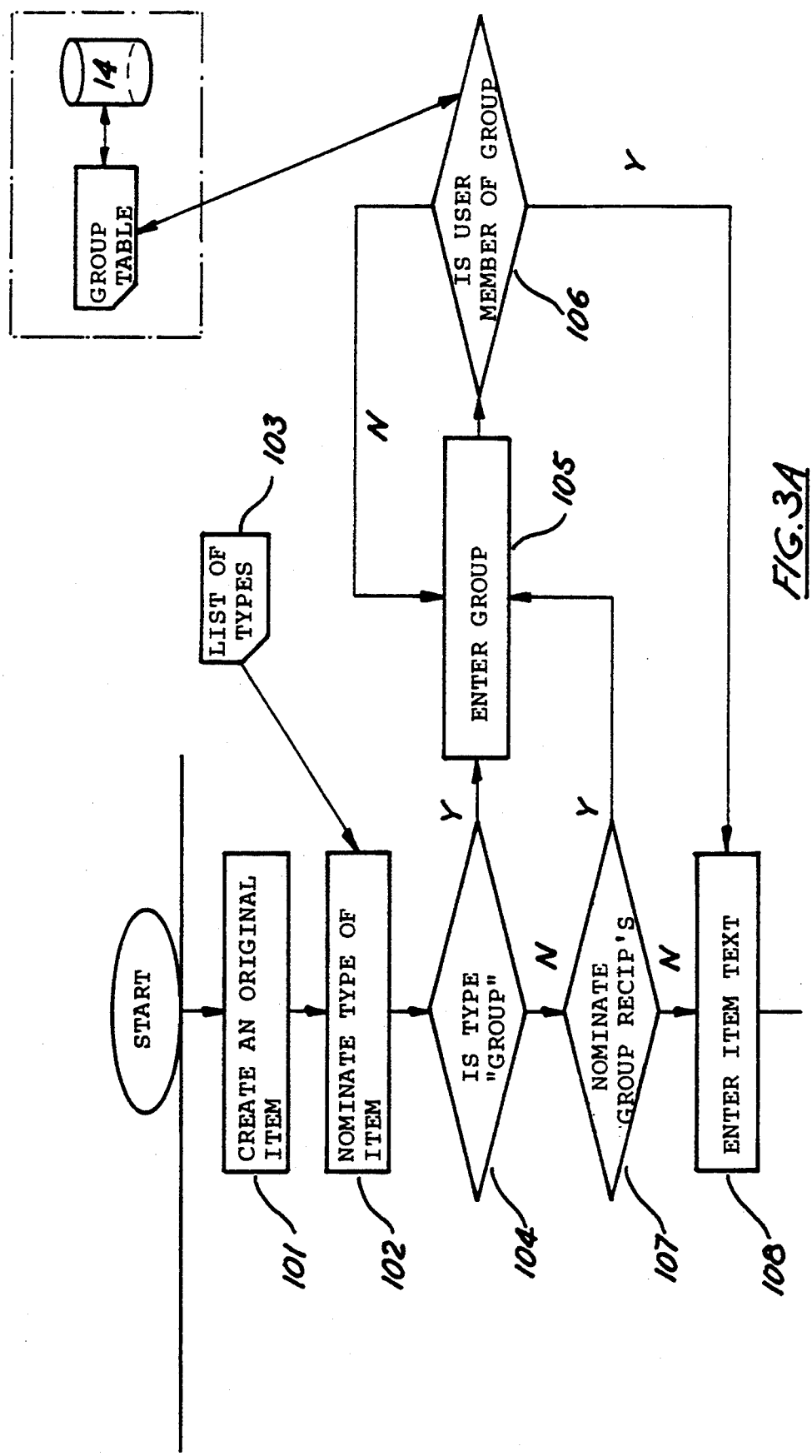
FIGS. 3(A) and 3(B), taken together, is a flowchart illustrating the item creation subsystem of FIG. 2.

Referring now to FIGS. 3(A) and(B), there is shown a flowchart illustrating the Item Creation subsystem 12 of the preferred embodiment. In order to use the Item Creation subsystem the software embodying the invention must have been executed. After suitable initialisation and verification of user access (e.g. user name, password) the user's VDU presents a Main System Menu. The user's responses are indicated by operation of the keyboard or, in some cases, a pointing device such as a mouse.

Beginning at START in FIGS. 3(A), the user selects "Create an Original Item" 101 from the Main System Menu. The user then nominates 102 the type of item being created by selecting from a further menu 103 of the available types: Open, Group and Private. If the user selects Group 104 and enters a particular group name 105, the system determines by reference to a file designated Group Table 14, on the disk drive, whether 106 the user is a member of that Group. The security features of the preferred embodiment ensure that an information item of type Group can only be disseminated to members of the user's group. It is necessary to nominate that group at 105 because a user may belong to several groups. A negative response to the type query 104 implies that the item may be of Open or Private type, in which case group recipients may still be nominated, but dissemination will not be restricted to members of the group only. A further query 107 determines therefore whether group recipients are to be nominated—to be entered 105 and checked 106 as previously described.

Once the system is satisfied as to group membership the user enters 108 item text indicating, in response to a subsequent enquiry 109, whether the information derives from a default source or some alternate source specified 110 by the user. Similarly, the system enquires whether the item is to have a default expiry date 111 or an expiry date within the valid range of 1 to 20 weeks 112 entered 113 by the user. It will be understood that the range of valid expiry dates may be variable according to the application of the invention, and may in some circumstances be nominated by the user.

Further enquiries establish whether the user wishes to nominate attached documents 114 and accept the default priority level 115. If it is desired to nominate attached documents, which are then effectively incorporated into the information item by reference, the documents must be specified 116. The attachment of documents in the system provides that they may be readily presented in their original format to users inspecting the information item or alerted by the dissemination function. The default priority level is determined by such factors as the item's source and the user's identity. Alternatively, the default may be overriden by a value entered 117 by the user from a list 118 of valid priority levels. Typically the list includes the values Urgent, High, Medium and Low.

Dissemination of information items may also be achieved by the use of keywords or by directly specifying intended recipients. Accordingly, the user is asked at 119 whether the information is of type Private. Private items are not disseminated through keywords. A negative answer therefore prompts a request 120 for keywords. The keywords entered 121 by the user are compared and verified against a Thesaurus Table 15 file on the disk drive. Only valid keywords are accepted.

Finally, the user is asked 122 to nominate 123 individual recipients. Thus, the user may specify individual recipients in addition to the group recipients nominated 107 earlier and those determined by dissemination through keywords. Individual recipients specified by the user are verified against a User Table 13 file on the disk drive which maintains records for each valid user.

At this point the parameters necessary for item dissemination 124 have been defined and control by the Item Creation subsystem may be relinquished. Control may temporarily pass to the Keyword Escalation subsystem, as will be described hereinafter with reference to FIGS. 8 and 9. Additional item parameters will also be discussed as they relate to features of the invention yet to be described.

In other embodiments, items can be created by a batch entry process in which text derived from news wire services, computer bulletin boards, word processors etc, is assembled with keywords selected from the thesaurus automatically by matching the text against nominated keywords from the thesaurus or synonyms of those keywords. Users can also submit text to the system by electronic mail for automatic keyword selection.

For each user of the system an interest profile is created which lists categories of information of interest to the user and comprises another list of keywords taken from one or more thesauri with, for each keyword, the priority level that an item must have for it to be of interest to that user. Thus a user will only be alerted to information he or she wants to see. The user may also nominate an 'all message' priority which indicates interest by the user in any item at that priority, or higher. Table 3 shows two sample interest profiles—for users interested in the computer and finance industries. Referring to Table 3, it will be noted that the computer oriented user has elected to receive notification of all urgent information items by means of the 'all message priority'. These examples assume of course, the existence of thesauri incorporating the keywords used.

Figure 4A:
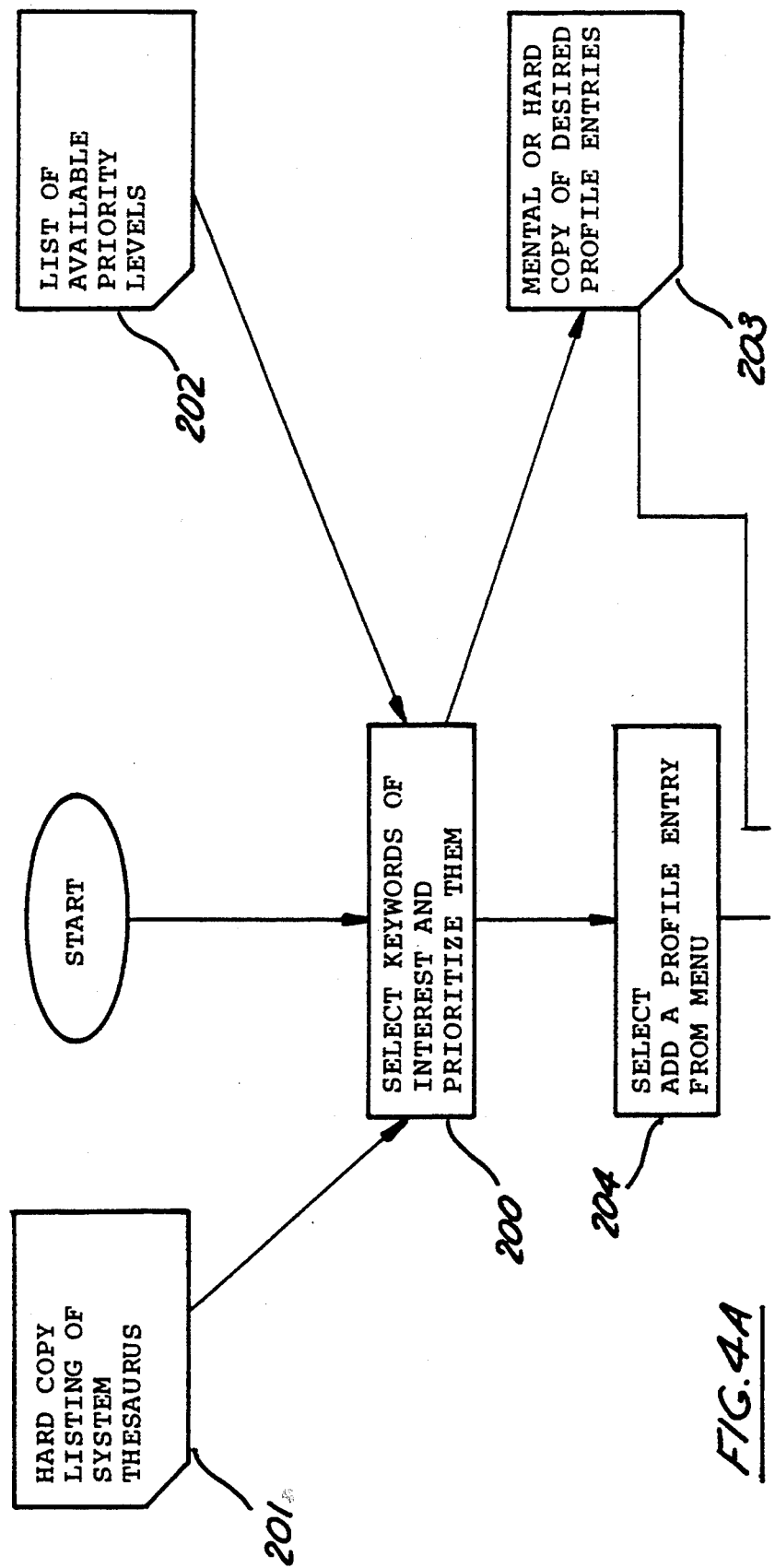
FIGS. 4(A) and 4(B), taken together, is a flowchart illustrating the interest profile creation subsystem of FIG. 2.
Figure 4B:
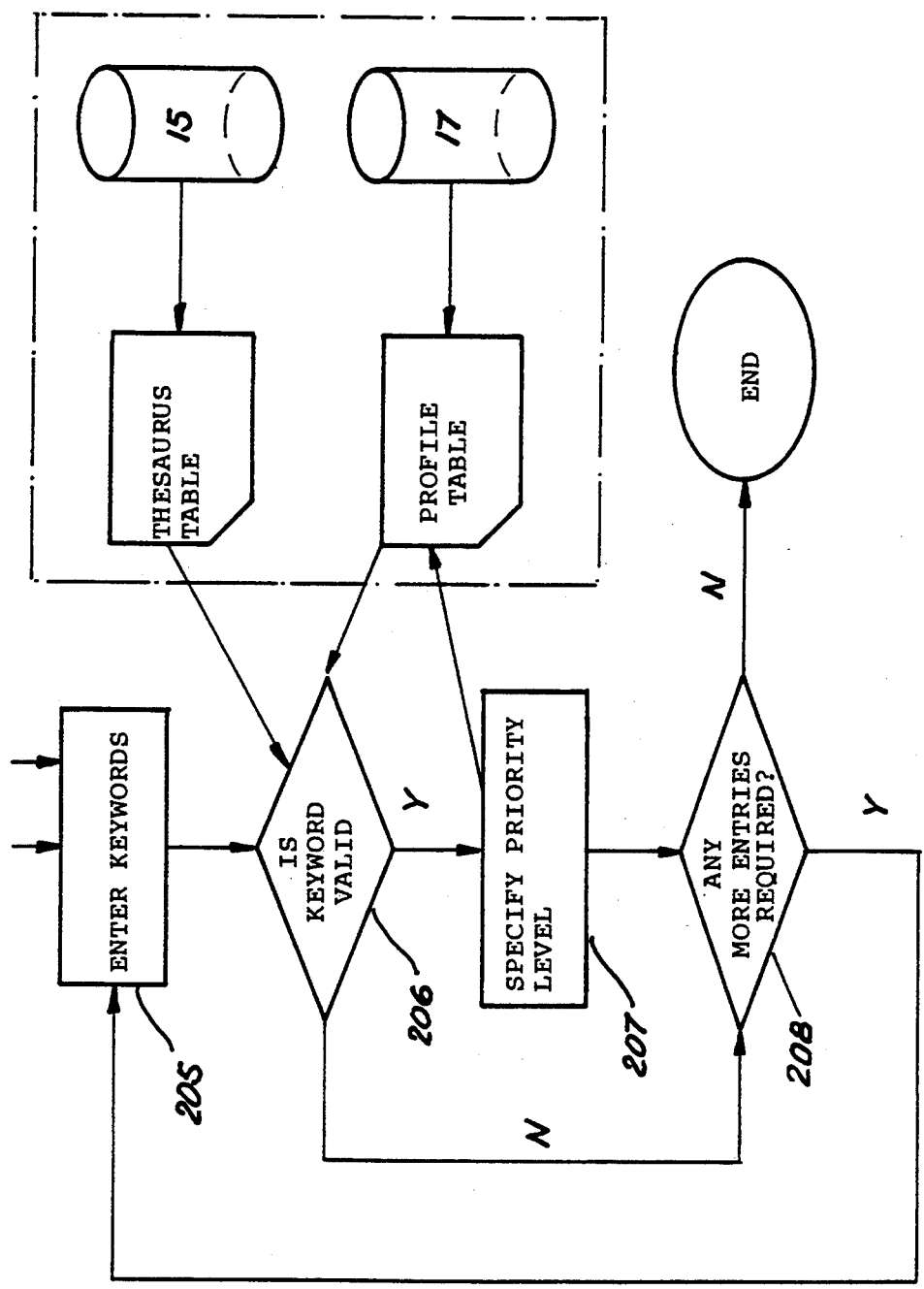

Referring to FIGS. 4(A) and 4(B), there is shown a flowchart of the Interest Profile Creation subsystem 16 of the preferred embodiment. The initial step of creating an interest profile, in which the user selects keywords of interest and prioritises them 200, may be performed away from the computer system with the aid of a hard copy listing 201 of the system thesaurus and a list 202 of available priority levels. Having a mental or hard copy 203 of desired interest profile entries, the user activates the software and selects "Add a profile entry" 204 from the Main System Menu. This allows creation as well as of updating an interest profile record in mass storage. Keywords are entered 205 one at a time for checking against the Thesaurus Table 15 file on the disk drive. For valid keywords 206 a priority level is specified 207 and stored together with the keyword and user identification in a Profile Table 17 file also on the disk drive. This process continues 208 until the user indicates that no more interest profile entries are required.

By means of a browsing facility the system allows users to inspect information not selected by their interest profiles. In this way unexpectedly valuable items may be identified and commented upon. Users may choose to browse according to selected parameters. The parameters discussed above permit, for example, the database to be searched for all items from a particular source and with a particular keyword. It may also be necessary to specify a thesaurus. The ability to comment on an item enables users to increase its value by adding information to it or by simply recognising and re-evaluating its importance.

Figure 3B:
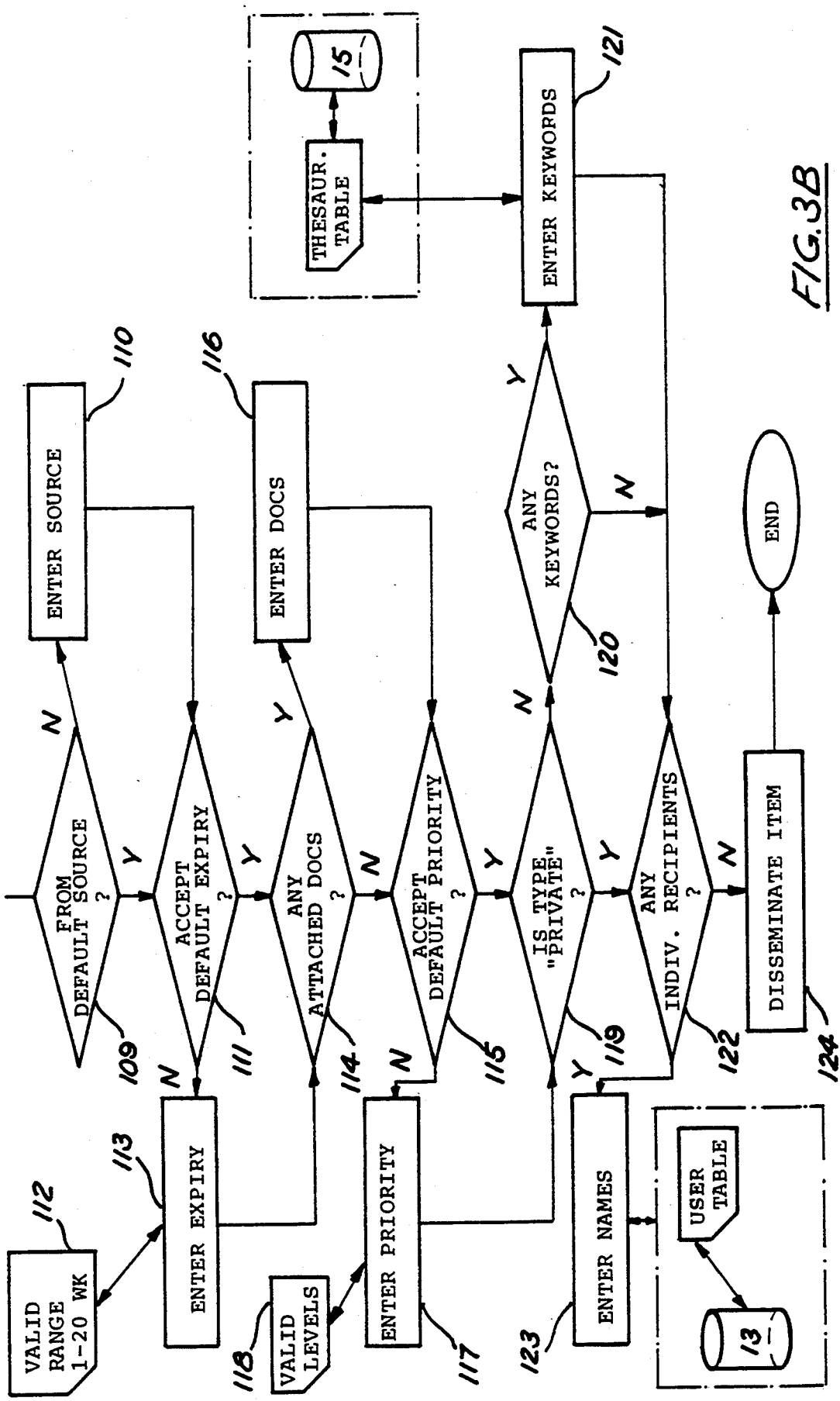

In use, a system in accordance with the invention compares the keywords associated with each item of information with the interest profile of each user and, provided the importance value of the information is sufficiently high, alerts each relevant user and offers the information to him or her. In this, the dissemination function, the system builds a list of users who are eligible to receive the information. The list includes: those users whose interest profiles contain the keywords associated with the item at or below the item priority level plus any users nominated by the author of the item at the time of creation (FIG. 3) less any users who are not members of a distribution or security group associated with the item.

Figure 5B:
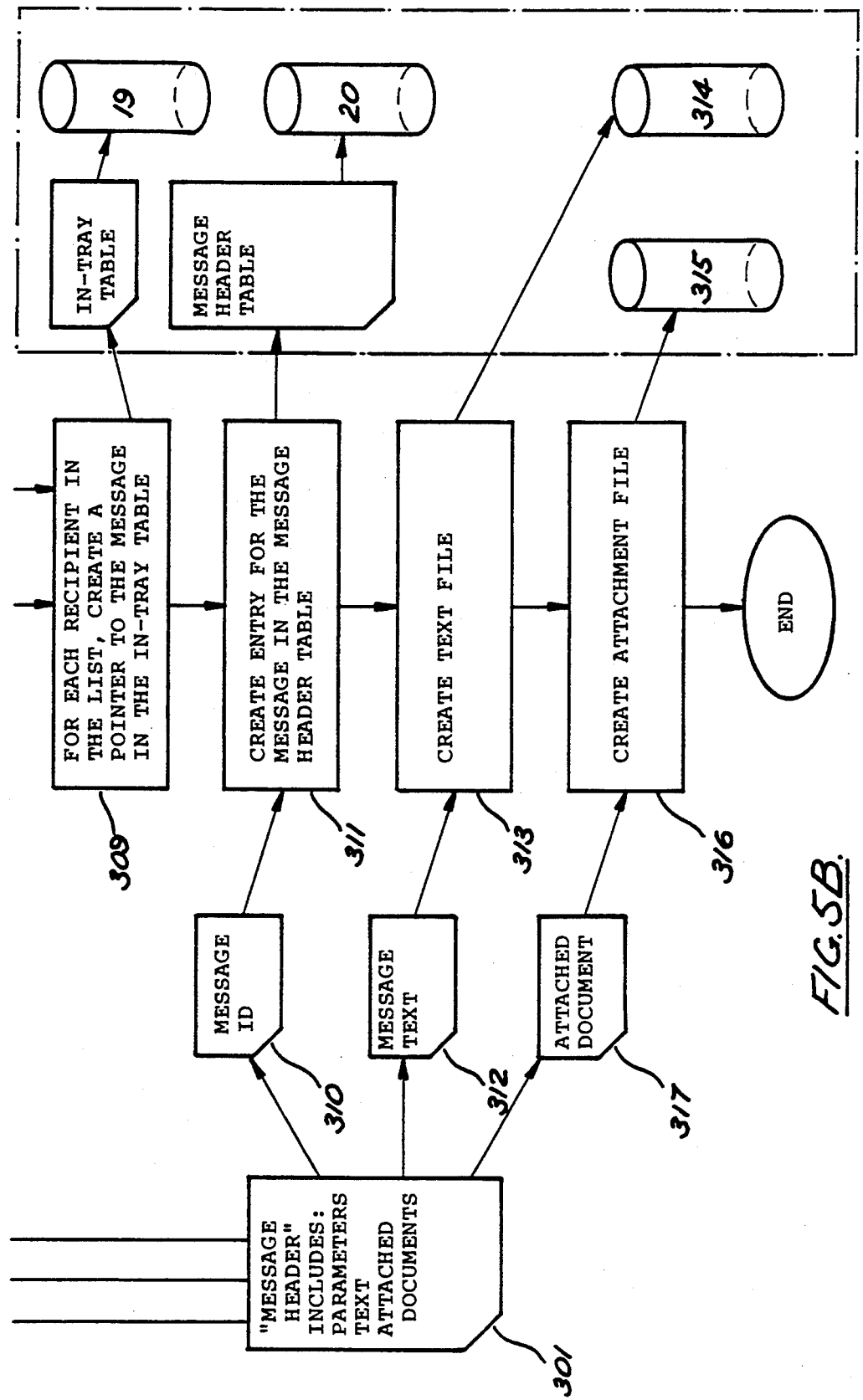

FIGS. 5A and 5(B) illustrate, in flowchart form, the Item Dissemination subsystem 23 of the preferred embodiment. At the beginning of the flowchart the user has created an item or comment and has elected to disseminate the item. Alternatively the item may have been created by the batch entry process from text derived from news wire services, computer bulletin boards, with keywords selected automatically or the item may have been submitted for dissemination by electronic mail. Accordingly, for each item to be disseminated a Message Header 301 is assembled in the computer's main memory 5. The Message Header includes all the parameters defined during item creation together with the item text and any attached documents. As described with regard to the Item Creation subsystem, attachment of documents allows additional material to be associated with an information item when it is disseminated.

For each item therefore the Dissemination subsystem compares keywords and priority levels 302 from the Message Header with information from the Profile Table 17 file on the disk drive. This allows the subsystem to create 303 a recipient list 306 identifying users whose profile entry matches the keyword/priority values in the Message Header.

The recipient list is supplemented 304 with details of individual recipients 305 nominated by the item originator and stored in the Message Header. The recipient list is further supplemented 307 by adding the members of groups specified as Group Recipients 308 in the Message Header. This step requires access to the Group Table 14 file on the disk drive.

For each recipient in the list an IN-Tray 19 file is created or amended 309 to point to the information item. At this point also the information contained in main memory is transferred to the disk drive; parameters 310 from the Message Header are appended 311 to a Message Header Table 20 file in which Header records contain the item parameters. The item text 312 is placed in a text file 314, created 313 for the purpose, and an attachment file 315 is created 316 for any attached documents 317.

A user, once alerted to a valuable item of information, is given the opportunity to modify the importance value. In addition, comments may be added in browse mode. Whether as a result of dissemination or browsing, a user, having decided that an item of information deserves comment, creates a further item—associated with the first—containing additional information, questions or commentary. The comment item inherits many of its parameters from the parent item. The system nominates keywords from the original item and the user may selectively accept them, delete them or supplement them.

In this manner the information in the system may be augmented by input from the users, questions may be asked of specific users and responses directed accordingly. A collection of information items related in this manner is termed a 'discussion'. The context of a discussion is defined by the parameters (especially keywords) of its constituent information items.

Figure 7:
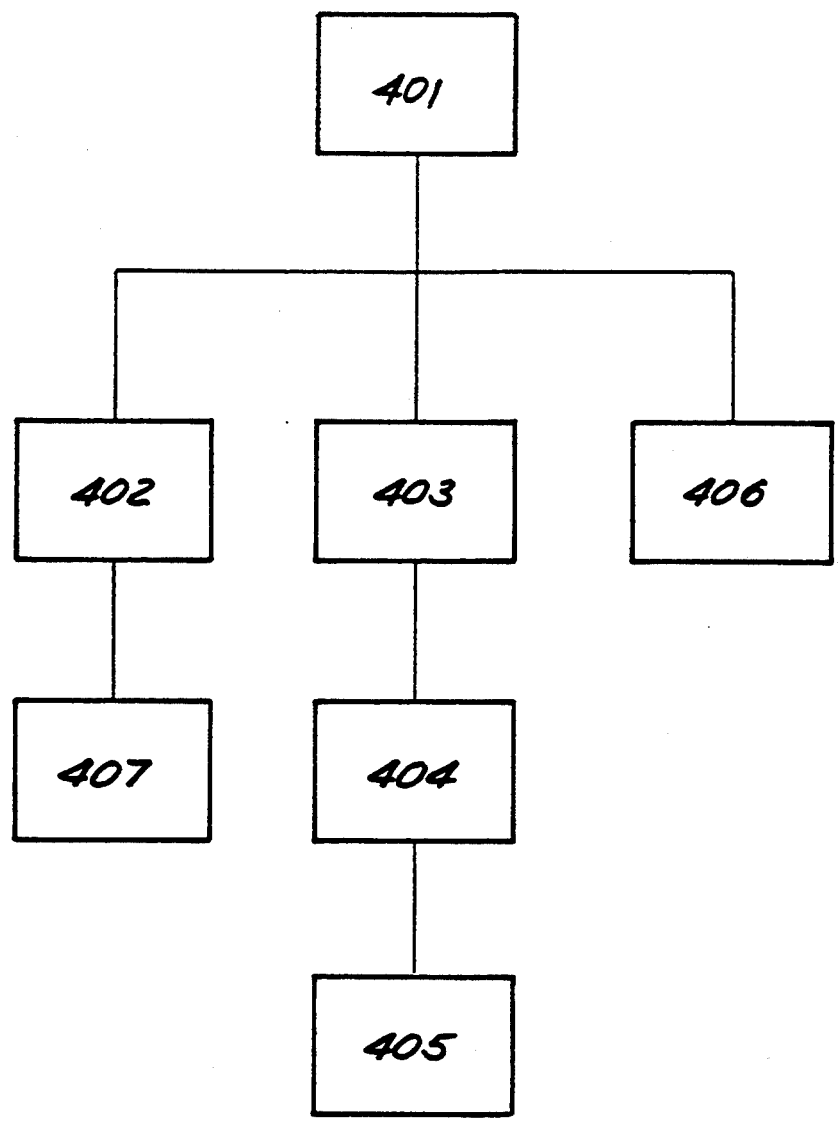
FIG. 7 shows an example discussion structure.

As the example discussion structure in FIG. 7 shows, an original item 401 of information attracts comment from users. In particular two different comments 402, 403 are entered into the system. These comments contain different information but are each related to the original item. Further comments follow but comment 404 relates to comment 403 and comment 405 relates to something within comment 404. These and all comments may have been elicited as a result of the dissemination process or may have arisen from browsing by users. Every time a comment is added the user responsible has the opportunity to increase its priority level from the level inherited from the item commented upon. While it is possible to downgrade the importance of a comment, the advantage of raising it is to broaden the audience of users who will then be alerted to its presence.

If, some time later, a user decides to enter a comment 406 on the original item 401, a different line of discussion is established. This particular discussion concludes with a comment 407 on previous comment 402, however there is clearly no significant limit to the size of a discussion.

Figure 6B:
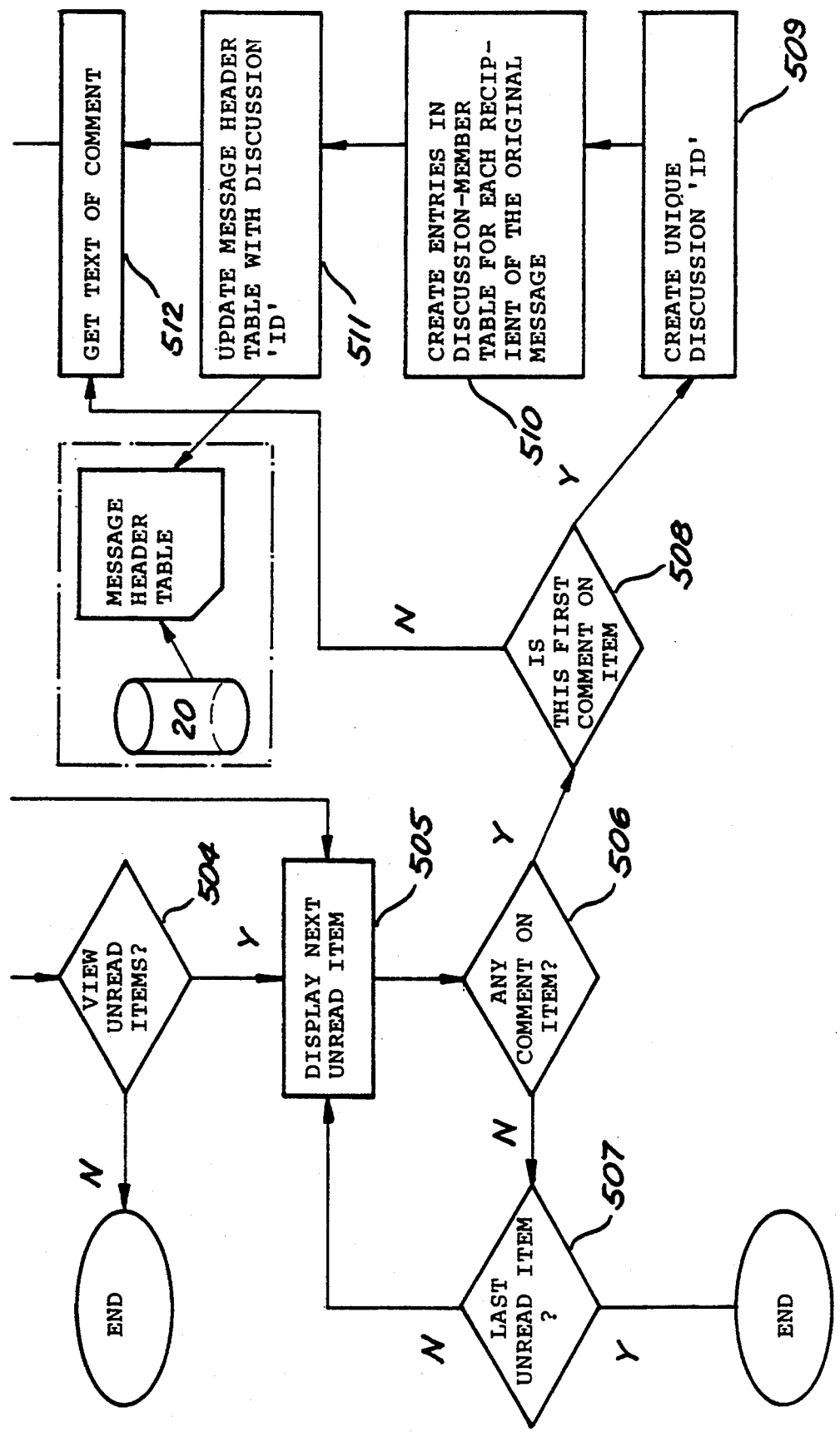

FIGS. 6(A) and 6(B) show, again in flowchart form, the Commenting/Discussion-Building subsystem 18 of the preferred embodiment. System users are generally alerted to the presence of messages immediately after log-in. The flowchart illustrates log-in 500 with reference to a User Table 13 file containing records of user names/passwords and access levels. Upon log-in, the Commenting/Discussion-Building subsystem interrogates 501 the user's IN-Tray, previously set up by the Item Dissemination subsystem 23, to determine 502 whether there are any unread items for the user. If there are no items of course the subsystem terminates.

Any unread messages are assembled 503 into a list by reference to the user's IN-Tray Table 19 file, the Message Header table 20 file, the text file. 314 containing Item Text and Attached Document file 315 as necessary. The user is then alerted to the presence of unread items and invited 504 to view them. Assuming the user does not decline to view the messages, the subsystem goes into a loop in which the next unread item is displayed 505 and comment is invited 506. If no comment is to be added the subsequent items are displayed 505 until the list is exhausted 507.

In the event that comment is to be added and it is the first comment 508 on an original item, a unique Discussion-ID 509 is created and entries are made 510 in a Discussion Member Table file (not shown) for each recipient of the original message. This information identifies groups of system users taking part in a particular discussion. The Discussion-ID 509 is used to update 511 the Message Header Table 20 file on the disk drive. At this point the text of the comment is entered 512 and keywords added 513 as required or suggested 514 by the user. The parameters of the original items are suggested as a default, but may be changed by the user. This tends to preserve the context of the discussion. Following the addition of keywords it may be necessary or desirable to raise 515 the priority level of the comment from the level inherited from the original item. The new priority level may be entered 516 by the user creating the comment or by priority level escalation—described below.

For the purposes of disseminating information a comment item is treated as an original item. The Item Dissemination subsystem 23 is therefore invoked 517 with regard to the comment item and the process of displaying 506 unread messages continues 518 until the list is exhausted. As was described with reference to the Item Creation Subsystem, control may pass to the Keyword Escalation subsystem prior to dissemination of the comment item.

In practice items are deleted, or preferably archived, from the database at the discretion of the system administrator. Where items may form part of a discussion caution must be exercised so that important comments are not lost. The system automates this procedure by assigning to every item (or prompting the users to do so) an expiry date at which time the information is deemed to be of no interest. In consequence a discussion is only terminated (and therefore eligible for archiving) when the expiry dates of all associated items are reached.

Figure 8:
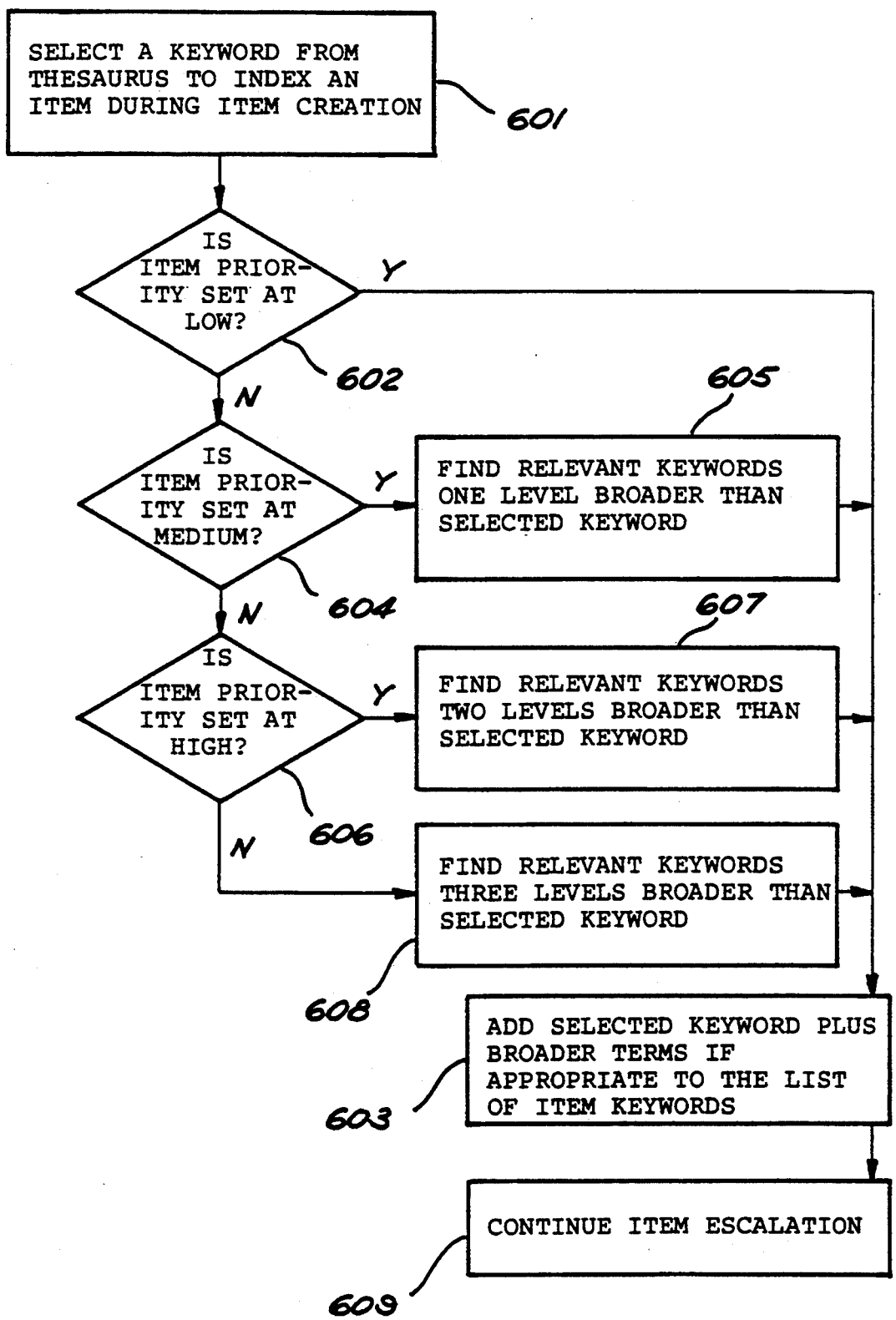
FIG. 8 and FIG. 9 show a Keyword Escalation subsystem of the preferred embodiment.
Figure 9:
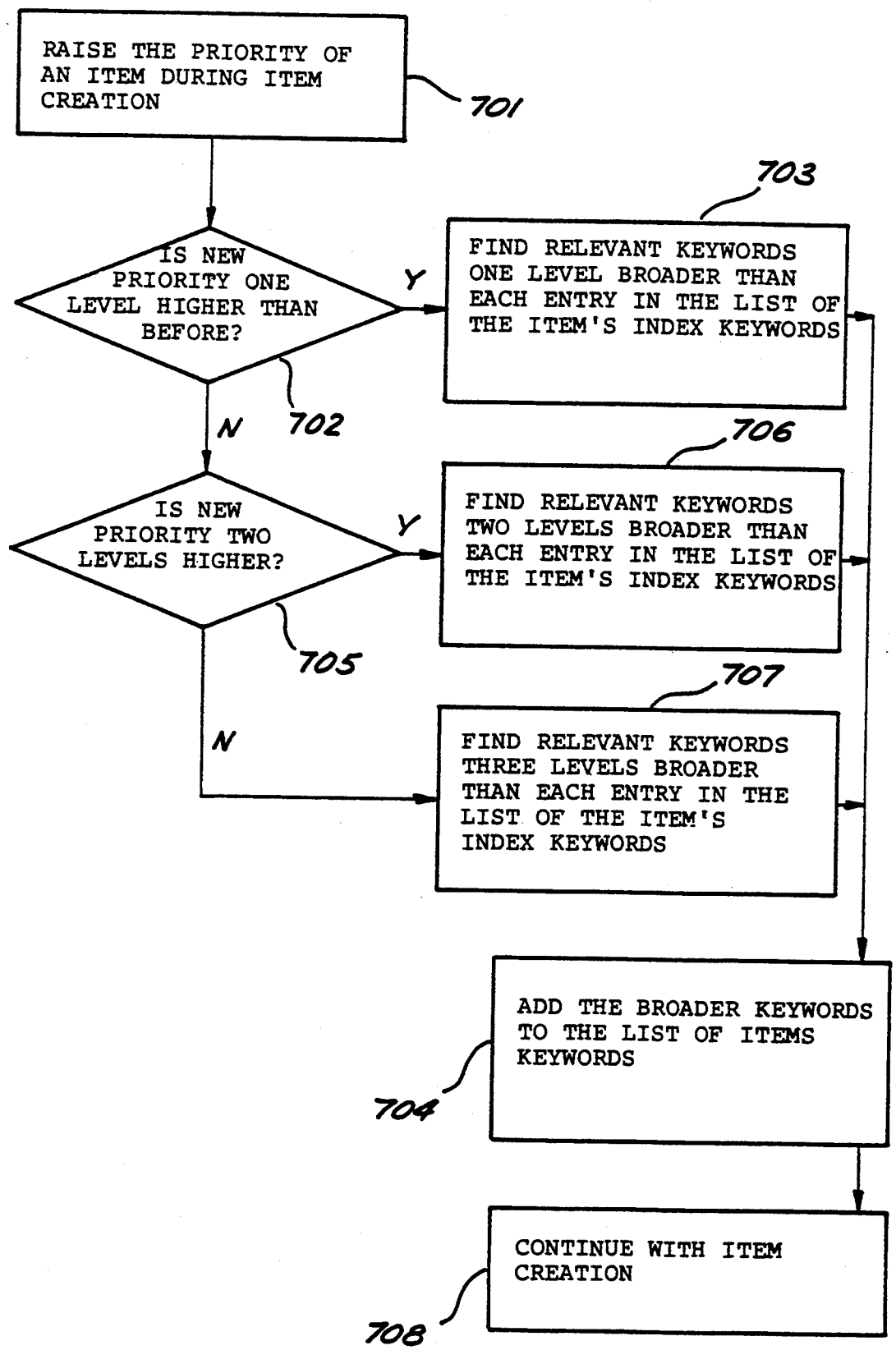

A particularly important feature of the present invention is the escalation of priority level and addition of keywords during the process of creating and commenting on information items. Escalation is a process whereby the audience for information is widened as it increases in importance and acquires more keywords. The hierarchical list of keywords in the thesaurus provides a range of descriptive terms varying in scope. When a user selects a keyword from a system thesaurus to describe an item's content and then nominates a priority level, the system adds broader keywords depending on the priority level nominated for that item. This aspect of the Keyword Escalation subsystem is illustrated in FIG. 8. Similarly if a user increases the priority level of an item the system adds broader terms for any currently selected keywords. FIG. 9 illustrates the operation of the Keyword Escalation subsystem by this method.

Referring now to FIG. 8, the user selects 601 a keyword from the thesaurus to index an item during item creation. If the item priority level is then set to low 602, the system proceeds to add 603 the selected keyword to the list of item keywords. Should the nominated priority level be medium 604 then keywords from the thesaurus one level broader 605 than the selected keyword are also added 603 to the list of item keywords. Similarly if the nominated priority level is high 606 then keywords one and two levels broader 607 than the selected keyword are added 603 to the list of item keywords.

If the nominated priority level is not low, medium or high then it must be urgent, in the preferred embodiment, and so keywords one, two and three levels broader 608 than the selected keyword are added 603 to the item keyword list. After the list is updated the item creation process continues 609. It will be appreciated that, because no broader keywords are added when the nominated priority is low, routine items of information do not automatically acquire value.

In a corresponding process, illustrated in FIG. 9, a user may selectively increase 701 the previously nominated priority level of an information item. This may occur during commenting or browsing. If the user increases the priority previously nominated by one level 702, the system adds 704 to the currently selected keyword list all broader terms one level 703 up the thesaurus hierarchy for each selected keyword. No escalation is possible for keywords at the broadest level of the thesaurus hierarchy.

If the user increases the priority previously nominated by two levels 705, the system adds 704 to the currently selected keyword list all broader terms one and two levels 706 up the thesaurus hierarchy for each selected keyword. This process also stops when the broadest level is reached for any keyword.

A similar process 707 takes place if the user increases the priority three or more levels above the lowest. Once keywords are added 704, the item creation proceeds 708. The final keyword list associated with each information item consists of those keywords selected by the user, those nominated by the system in the case of a comment and those resulting from the escalation process.

It has been demonstrated that a database system in accordance with the present invention provides efficient improved dissemination of important information to the appropriate audience. By flexibly relating parameters indicative of subject matter and importance, the system ensures that data is correctly distributed as it acquires value through commenting and upgrading. To this end, the system offers facilities for generally updating and augmenting the information in the database through a browse capability. More focussed information may be effectively disseminated through the ability to alert specific users or groups of users, and the system is easily extended to include security features whereby certain information is only available to selected users.

Moreover informal discussion may be stimulated by seeding the item database to encourage comments from users. Batch entry facilities permit collection and integration of information from, for example, news services in order to seed the database.

Although reference has been made to specific examples, it will be appreciated by those skilled in the art that the invention may be embodied in many other forms.

TABLE 1

EXECUTIVE
    MAJOR BUSINESS ISSUES
        COMPETITIVE ISSUES
            COMPETITORS
            MARKET SHARE
            LOST CONTRACTS
        . . . . . . . . .
        FINANCE ISSUES
            IRS AUDIT PROGRESS
    . . . . . . . . .
    INTERNATIONAL DIVISIONS
        ASIA/PACIFIC REGION
        EUROPEAN REGION
    . . . . . . . . .
    RESEARCH AND DEVELOPMENT
    . . . . . . . . .
    OPERATIONS DIVSIONS
        MARKETING AND SALES
            DISTRIBUTION NETWORK
            NEW PRODUCT LAUNCHES
            CUSTOMERS
                RETAIL CUSTOMERS
                FINANCE CUSTOMERS
                PROBLEM CUSTOMERS
                MAJOR PROSPECTS
        . . . . . . . . .
        PRODUCTION
    . . . . . . . . .
    CORPORATE AIRCRAFT OPERATIONS
. . . . . . . . .

TABLE 2

MARKETING AND SALES
    CUSTOMERS
        RETAIL CUSTOMERS
            SEARS
                SEARS-ATLANTA
                SEARS-NYC
                SEARS-PHILADELPHIA
            MACYS
        . . . . . . . . .
        FINANCE CUSTOMERS
        PROBLEM CUSTOMERS
        MAJOR PROSPECTS
            TELCO SERVICES
                TELCO SW
                TELCO SE
                TELCO INTERNATIONAL
    . . . . . . . . .
    DISTRIBUTION NETWORK
        WHOLESALE NETWORK
            WHOLESALE TRANSPORTATION
        VALUE ADDED RESELLER NETWORK
        RETAIL NETWORK
    . . . . . . . . .
    NEW PRODUCT LAUNCHES

TABLE 2-continued

. . . . . . . . .
PRODUCTS AND SERVICES
. . . . . . . . .

TABLE 3

EXAMPLE USER INTEREST PROFILES

| KEYWORD | PRIORITY |
|---|---|
| All message priority | U |
| Compiler | M |
| DEC | H |
| Lotus | L |
| Software | U |
| Vaxmate | M |
| BHP | L |
| Bell Resources | M |
| Diversified Resources | H |
| Equities | U |
| Government Securities | H |
| Special Situations | L |

I claim:

1. A database user alerting method for use with a database system in which are stored a plurality of information items, said method including the steps, performed in a computer system, of:

storing in association with each information item in the database system a plurality of parameters including (i) at least one keyword indicative of the subject matter of said information item, and (ii) a priority level value for each information item, wherein said priority level value is selected from a predetermined set of priority level values, and wherein said at least one keyword is selected from a finite hierarchical set of keywords having a tree structure relating broad keywords to progressively narrower keywords;

creating and storing an interest profile for each database user indicative of categories of information of interest to said each database user, said interest profile comprising (i) a list of keywords taken from said finite hierarchical set and (ii) an associated priority level value for each keyword;

comparing the parameters stored in association with each information item with the stored interest profile for each database user; and, alerting a database user of the existence of an information item when said interest profile for that database user includes (i) at least one keyword associated with the information item and (ii) a priority level value associated with said at least one keyword that does not exceed the priority level value associated with the information item.

2. The method as claimed in claim 1, wherein said priority level value is a value within a range of low to high priority level values, said method further including the step of increasing the number of keywords stored in association with an information item in proportion, and in response, to an increased priority level value.

3. The method as claimed in claim 2, wherein said step of increasing the number of keywords adds keywords connected by said tree structure.

4. The method as claimed in claim 1, further including the step of permitting a database user to create a comment item of information, and storing in association with the comment item said plurality of parameters.

5. The method as claimed in claim 4, wherein said comment item is related to an information item by the comment item having a set of parameters substantially similar to the parameters of said information item, said method further including the step of permitting the database user to modify said parameters of said information item.

6. The method as claimed in claim 5, further including the step of relating a number of comment items having at least one common parameter, said common parameter defining a context, said related items defining a discussion.

7. The method as claimed in claim 6, further including the step of storing, in association with each information item, a parameter indicative of an expiry date beyond which the priority level value is changed to initiate deleting the item or archiving the item.

8. The method as claimed in claim 7, further including the step of taking, as an expiry date parameter of a group of related items, the latest expiry date of the expiry dates of each item.

9. The method as claimed in claim 1, further including the step of storing, in association with an information item, parameters indicating that access to said information item is to be restricted to members of one or more groups of database users.

10. The method as recited in claim 9, further including the step of allowing the database user to examine an information item whose parameters match parameters selected by the database user provided that said database user is a member of a group indicated by the parameters associated with said information item.

11. A database user alerting system including a plurality of information items, said system alerting database users of the system to the presence in the system of selected ones of said plurality of information items of interest to each of said database users, said system including:

means to store a finite hierarchical set of keywords having a tree structure relating broad keywords to progressively narrower keywords;

means to store said plurality of information items;

means to store, in association with each of said information items, a plurality of parameters including (i) at least one keyword indicative of the subject matter of each of said information items and (ii) a priority level value for each of said information items, wherein said priority level value is selected from a predetermined set of priority level values, and wherein said at least one keyword is selected from said hierarchical set;

means to create an interest profile for each of said database users indicative of categories of information of interest to said database users, said interest profile comprising (i) a list of keywords taken from said finite hierarchical set and (ii) an associated priority level value for each keyword;

comparator means to determine said selected items of information of interest to each database user by comparing the parameters stored in association with each information item with the parameters stored in the interest profile for each database user and by selecting information items when the interest profile for a database user includes (i) at least one keyword associated with the information item and (ii) a priority level value associated with the at least one keyword that does not exceed the priority level value associated with the information item; and, output means to output an indication of the or each selected items of information of interest to each corresponding database user.

12. The system as claimed in claim 11, wherein the priority level value is a value within a range of low to high priority level values, said system further including means to increase the number of keywords associated with an information item in proportion, and in response, to an increased priority level value.

13. The system as claimed in claim 12, wherein said means to increase the number of keywords includes means to add keywords connected by said tree structure.

14. The system as claimed in claim 11, further including means to permit a database user to create a comment item of information, and means to store, in association with each said comment item, said plurality of parameters.

15. The system as claimed in claim 14, further comprising means to relate said comment item to an existing information item by substantially duplicating the parameters of said existing information item and associating those parameters with said comment item, and means to permit the database user to modify the parameters associated with said comment item.

16. The system as claimed in claim 15, further including means to relate a plurality of comment items having at least one common parameter.

17. The system as claimed in claim 11, further including means to associate with each information item a parameter indicative of an expiry date beyond which the priority level value is changed to initiate deleting the item or archiving the item.

18. The system as claimed in claim 17, further including means to establish the expiry date parameter of a group of related items as the latest expiry date of the expiry dates of any of the items.

19. The system as claimed in claim 11, wherein information items include parameters indicating that access to the information item is to be restricted to members of one or more groups of database users.

20. The system as claimed in claim 11, further including means to allow a database user to examine an information item whose parameters match parameters selected by the database user.

21. The system as claimed in claim 20, further including means to allow said database user to modify said information item whose parameters match parameters selected by the database user.

* * * * *

UNITED STATES PATENT AND TRADEMARK OFFICE
CERTIFICATE OF CORRECTION

PATENT NO. : 5,428,778
DATED : June 27, 1995
INVENTOR(S) : Cyril Brookes

It is certified that error appears in the above-indentified patent and that said Letters Patent is hereby corrected as shown below:

In Col. 1, lines 60-65, please delete from "(ii) a priority level . . . keywords;" and substitute therefor the following:

--(ii) a priority level value for each information item, wherein said priority level value is selected from a predetermined set of priority level values, and wherein said at least one keyword is selected from a finite hierarchical set of keywords having a tree structure relating broad keywords to progressively narrower keywords;--

In Col. 2, lines 10-17, please delete from "(ii) a priority level value . . . keywords" and substitute therefor the following:

--(ii) a priority level value associated with said at least one keyword that does not exceed the priority level value associated with the information item.

In a second aspect of the present invention, a database user alerting system includes a plurality of information items, alerts database users of the system to the presence in the system of selected ones of said plurality of information items of interest to each of said database users, and includes:

means to store a finite hierarchical set of keywords having a tree structure relating broad keywords to progressively narrower keywords;--

UNITED STATES PATENT AND TRADEMARK OFFICE
CERTIFICATE OF CORRECTION

PATENT NO. : 5,428,778
DATED : June 27, 1995
INVENTOR(S) : Cyril Brookes

It is certified that error appears in the above-indentified patent and that said Letters Patent is hereby corrected as shown below:

In Col. 2, line 28, after "hierarchical set" add --;--.

In Col. 2, line 56, "a used" should be --a user--.

In Col. 5, line 56, "FIGS. 3A" should be --FIG. 3A--.

In Col. 9, line 24, "file. 314" should be --file 314--.

Signed and Sealed this

Seventeenth Day of September, 1996

Attest:

BRUCE LEHMAN

Attesting Officer

Commissioner of Patents and Trademarks